(12) United States Patent
Judson

(10) Patent No.: US 6,185,586 B1
(45) Date of Patent: *Feb. 6, 2001

(54) CONTENT DISPLAY DURING IDLE TIME AS A USER WAITS FOR INFORMATION DURING AN INTERNET TRANSACTION

(76) Inventor: David H. Judson, 6823 Northport, Dallas, TX (US) 75230

(*) Notice: Under 35 U.S.C. 154(b), the term of this patent shall be extended for 0 days.

This patent is subject to a terminal disclaimer.

(21) Appl. No.: 09/055,726

(22) Filed: Apr. 6, 1998

Related U.S. Application Data

(63) Continuation of application No. 08/708,795, filed on Sep. 9, 1996, now Pat. No. 5,737,619, which is a continuation-in-part of application No. 08/543,876, filed on Oct. 19, 1995, now Pat. No. 5,572,643.

(51) Int. Cl.$^7$ .................................................. G06F 17/30
(52) U.S. Cl. ........................................ 707/513; 707/501
(58) Field of Search ................................ 707/501, 513; 705/14, 26, 27

(56) References Cited

U.S. PATENT DOCUMENTS

| | | |
|---|---|---|
| 4,782,463 | 11/1988 | Sanders et al. . |
| 4,827,508 | 5/1989 | Shear . |
| 4,833,308 | 5/1989 | Humble . |
| 4,850,007 | 7/1989 | Marino et al. ............... 379/88.2 |
| 4,953,209 | 8/1990 | Ryder, Sr. et al. . |
| 5,204,947 | 4/1993 | Bernstein et al. . |
| 5,297,249 | 3/1994 | Bernstein et al. . |
| 5,305,195 | 4/1994 | Murphy . |
| 5,321,740 | 6/1994 | Gregorek et al. . |
| 5,347,632 | 9/1994 | Filepp et al. ............... 709/202 |
| 5,355,472 | 10/1994 | Lewis . |
| 5,359,708 | 10/1994 | Bloomer et al. . |
| 5,367,621 | 11/1994 | Cohen et al. . |
| 5,367,623 | 11/1994 | Iwai et al. . |
| 5,408,659 | 4/1995 | Cavendish et al. . |
| 5,412,772 | 5/1995 | Monson . |
| 5,428,529 | 6/1995 | Hartrick et al. . |

(List continued on next page.)

FOREIGN PATENT DOCUMENTS

| | | |
|---|---|---|
| 9114781 | 5/1997 | (JP) . |
| 9778058 | 12/1997 | (KR) . |
| 9630864 | 10/1996 | (WO) . |

OTHER PUBLICATIONS

Oliver, Netscape 2 Unleashed, Sams.net Publishing, Feb. 1996, pp. 36, 37, 40, 41, 205–210, 498, 499, 576 and 577.*

Cathy Taylor, "Going Beyond the Banner", Jul. 8, 1996, pp. 36–41 (Brandweek 1996).

Jane Hodges, "Marketers play Web games as serious biz", Mar. 11, 1996, (Advertising Age).

Baker, Hypertext Browsing on the Internet, UNIX Review, v.12, n.9, Sep. 1994, pp. 21–26.

DeVoney, Using PCDOS, 1986, p. 340.

SPRY, AIRMSO. HLP Windows Help File, Apr. 3, 1995, Browsing With Mosaic, The SPRY Mosaic Console.

Gunn, Power in Pictures, Computer Shopper, Nov. 1994, v.14, n.11, p. 598–600.

Michalski, Content in Context, RELease 1.0, v.94, n.9, Sep. 27, 1984, pp. 1–13.

McArthur, World Wide Web & HTML, Dr. Dobb's Journal, Dec. 1994.

(List continued on next page.)

Primary Examiner—Stephen S. Hong

(57) ABSTRACT

A method of display as a user of the Internet uses a client machine during an Internet transaction (e.g., e-mail, file transfer, bulletin board, chat or browsing). The client machine supports a graphical user interface and mechanisms that provide such Internet services. The method locally stores information content served during idle periods when the user's connection to the network is live. During a given Internet transaction, the information content is retrieved and displayed to provide entertainment or information as the user waits for the Internet transaction to be completed.

10 Claims, 9 Drawing Sheets

U.S. PATENT DOCUMENTS

| | | |
|---|---|---|
| 5,428,670 | 6/1995 | Gregorek et al. . |
| 5,438,508 | 8/1995 | Wyman . |
| 5,442,771 | 8/1995 | Filepp et al. . |
| 5,461,667 | 10/1995 | Remillard . |
| 5,491,820 | 2/1996 | Belove et al. . |
| 5,511,160 | 4/1996 | Robson . |
| 5,515,490 | 5/1996 | Buchanan et al. . |
| 5,530,754 | 6/1996 | Garfinkle . |
| 5,548,745 | 8/1996 | Egan et al. ............................. 703/27 |
| 5,557,658 | 9/1996 | Gregorek et al. . |
| 5,706,502 | 1/1998 | Foley et al. ............................. 707/10 |
| 5,740,549 | 4/1998 | Reilly et al. ............................ 705/14 |
| 5,742,768 | 4/1998 | Gennaro et al. ................ 295/200.33 |
| 5,754,830 | 5/1998 | Butts et al. ........................... 709/311 |
| 5,768,508 | 6/1998 | Eikeland ............................... 709/202 |
| 5,781,894 | 7/1998 | Petrecca et al. . |
| 5,805,815 | 9/1998 | Hill . |
| 5,913,040 | 6/1999 | Rakavy et al. ........................ 709/232 |
| 5,933,811 | 8/1999 | Angles et al. ......................... 705/14 |

OTHER PUBLICATIONS

Davison, Coding With HTML Forms, Dr. Dobb's Journal, Jun. 1995, pp. 70–75, 106–109.

Grobe, Michael, "HTML Quick Reference", Oct. 11, 1995, Academic Computing Services, The University of Kansas.

Ayre, Rick and Don Willmott, "See the Sites Beyond Browsing" Oct. 10, 1995, PC Magazine, pp. 151–201.

Pike, et al., Using Mosaic, 1994, p. 82–85, 222–223.

Sreenivasan, S., "The World Wide Wait: Don't Get Mad, Get Off," *The New York Times*, Sep. 30, 1996, pgs. C5.

Kevin Kelly and Gary Wolf, et al, "Push! Kiss Your browser goodbye: The radical future of media beyond the Web," *Wired Magazine*, Mar. 1997, pp. 12–23.

Bonny L. Georgia, "Browsing without a Net," *Internet Magazine*, Dec. 1996, vol. 1, Issue 1, pp. 85–96.

\* cited by examiner

```
<HEAD>
<TITLE>United States Patent and Trademark Office</TITLE>
<LINK REV="OWNER" HREF="www@uspto.gov">
</HEAD>
<BODY>
<center>
<img width=172 height=164 src="ptog2.gif"
alt="[PTO Seal]">
<a href="http://www.uspto.gov/combio.html">
<img width=119 height=164 src="http://www.uspto.gov/lehman4.gif"
alt="[Commissioner Bruce Lehman]"></a>

<img width=231 height=139 src="http://www.uspto.gov/lequote.gif"
alt="[" ince 1790, the Patent
and Trademark Office has existed to bring to the
public the ideas of creators who have been able to think the previously
unthinkable."]">
<p>
<table border=5><tr><td
align=center><a href=http:www.uspto.gov/cgi-bin/imagemap/usptomap><img
border=0 width=569 height=240 src="usptomap.gif"
alt="[IMAGE-MAP]" ISMAP></a></td></tr></table>
</center>
<!--comment-->
<p><hr>
<ul>
<a href="http://www.uspto.gov/web/menu/menu1.html">
<li><b>Welcome to the U.S. Patent and Trademark Office
</b></a>
<!--comment-->
```

*FIG. 6*

```
<HEAD>
<TITLE>United States Patent and Trademark Office</TITLE>
<LINK REV="OWNER" HREF="www@uspto.gov">
</HEAD>
<BODY>
<center>
<img width=172 height=164 src="ptog2.gif"
alt="[PTO Seal]">
<a href="http://www.uspto.gov/combio.html">
<img width=119 height=164 src="http://www.uspto.gov/lehman4.gif"
alt="[Commissioner Bruce Lehman]"></a>

<img width=231 height=139 src="http://www.uspto.gov/lequote.gif"
alt="[" ince 1790, the Patent
and Trademark Office has existed to bring to the
public the ideas of creators who have been able to think the previously
unthinkable."]">
<p>
<table border=5><tr><td
align=center><a href=http:www.uspto.gov/cgi-bin/imagemap/usptomap><img
border=0 width=569 height=240 src="usptomap.gif"
alt="[IMAGE-MAP]" ISMAP></a></td></tr></table>
</center>
<!--comment-->
<p><hr>
<ul>
<a href="http://www.uspto.gov/web/menu/menu1.html">
<li><b>Welcome to the U.S. Patent and Trademark Office
</b></a>
<!--The PTO Welcomes You-->
```

FIG. 7

CONTENT DISPLAY DURING IDLE TIME AS A USER WAITS FOR INFORMATION DURING AN INTERNET TRANSACTION

This application is a continuation of prior application Ser. No. 08/708,795, filed Sep. 9, 1996, now U.S. Pat. No. 5,737,619, which application was a continuation-in-part of prior application Ser. No. 08/543,876, filed Oct. 19, 1995, now U.S. Pat. No. 5,572,643.

BACKGROUND OF THE INVENTION

1. Technical Field

This invention relates generally to computer networks and more particularly to methods for enhancing the operation of a client browser operating in a multi-server computer environment.

2. Description of the Related Art

The worldwide network of computers commonly known as the "Internet" has seen explosive growth in the last several years. Mainly, this growth has been fueled by the introduction and widespread use of so-called "web" browsers, which allow for simple graphical user interface (GUI)-based access to network servers, which support documents formatted as so-called "web pages". The "World Wide Web" (WWW) is that collection of servers of the Internet that utilize the Hypertext Transfer Protocol (HTTP). HTTP is a known application protocol that provides users access to files (which can be in different formats such as text, graphics, images, sound, video, etc.) using a standard page description language known as Hypertext Markup Language (HTML). HTML provides basic document formatting and allows the developer to specify "links" to other servers and files. Use of an HTML-compliant client browser involves specification of a link via a Uniform Resource Locator or "URL". Upon such specification, the client makes a tcp/ip request to the server identified in the link and receives a "web page" (namely, a document formatted according to HTML) in return.

There is a finite time period between the time the user initiates the link and the return of the web page. Even when the web page is returned quickly, there is an additional time period during which formatting information must be processed for display on the display interface. For example, most web browsers display inline images (namely images next to text) using an X bit map (XBM) or .gif format. Each image takes time to process and slows downs the initial display of the document. The user typically "sees" an essentially unrecognizable "image" on the display screen which only gradually comes into focus. It is only after the entire image is downloaded from the server and then processed by the browser that the user can fully access the web page itself. This "waiting" period is even longer when the client machine has a relatively slow modem, and often the user will have to wait many seconds before being able to see the in-line image and/or begin using the web page. This problem will be exacerbated when the next generation browser technology (such as Netscape Navigator 2.0) becomes more widely implemented because such browsers are being designed to handle much more complex download formats (for more interactive, dynamic displays).

BRIEF SUMMARY OF THE INVENTION

It is thus a primary object of the invention to enhance the operation of a web browser by causing the display of some useful information to the user during the period of user "downtime" that otherwise occurs between linking and downloading of a hypertext document identified by the link. Such information may include, without limitation, advertisements, messages, fill-in forms, notices from a service provider, notices from another Internet service (such as receipt of an e-mail message), or some third party notice.

It is another more particular object of the invention to use an Hypertext Markup Language comment (e.g., via an HTML comment tag) in a web page to store an information object related to a link and then formatting and displaying such information when the link is activated.

It is still another object of the invention to embed an information object within an existing web page so that the object is masked until a link to another web page is activated. Upon activation, the object is displayed to the user effectively as a "mini" web page while the browser calls the link and awaits for a reply and download.

For example, in one particular embodiment, the information object includes copyright management information for a hypertext document associated with a link in a currently-displayed page. Such information may include the name or other identifying information of a copyright owner, terms and conditions for uses of the work within the hypertext document, and such other information as may be prescribed or desired. When the user "hits" the link in the current page, the copyright management information (which is already present in the browser) is displayed as the new document is being accessed and downloaded. The copyright management information, for example, may inform the user of the terms and conditions of how the copyrighted content being downloaded can then be reused. The "time" period normally associated with the download is thus productive for both the user (since he or she no longer has to sit and wait for the display) as well as to the content provider.

According to the preferred embodiment, there is described a method of browsing the World Wide Web of the Internet using an HTML-compliant client supporting a graphical user interface and a browser. The method begins as a web page is being displayed on the graphical user interface, the web page having at least one link to a hypertext document preferably located at a remote server. In response to the user clicking on the link, the link is activated by the browser to thereby request downloading of the hypertext document from the remote server to the graphical user interface of the client. While the client waits for a reply and/or as the hypertext document is being downloaded, the browser displays one or more different types of informational messages to the user. Such messages include, without limitation, advertisements, notices, messages, fill-in forms, copyright information and the like. Preferably, the message information is in some way related to the hypertext document being accessed and downloaded, as in the case of copyright management information perhaps warning the user that the material being downloaded is subject to certain use restrictions of the copyright owner. Where the displayed information is related to the link, it is desirable that such information be embedded within the web page from which the link is launched. The information is preferably "hidden" within the web page using a hypertext markup comment tag.

The invention is preferably implemented in a computer having a processor, an operating system, a graphical user interface and a HTTP-compliant browser. In such case, the novel and advantageous features of the invention are achieved using a first means, responsive to activation of a link from a web page, for retrieving an information object masked within the web page, and a second means for displaying information from the information object on the graphical user interface as the browser establishes the link. Preferably, the information object is masked by an HTML comment tag, which may include other HTML tags nested therein to format the information in the object. This enables the support of complex "mini" web pages that are displayed and accessible to the viewer during otherwise non-productive periods when the browser is busy processing links to other documents or web sites.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 6 is a view of the HTML source code for the web page of FIG. 5;

FIG. 7 is an example of a modified version of the HTML source code for the web page illustrated in FIG. 5, showing an information object embedded therein through a comment tag;

DETAILED DESCRIPTION OF THE PREFERRED EMBODIMENT

Figure 1:
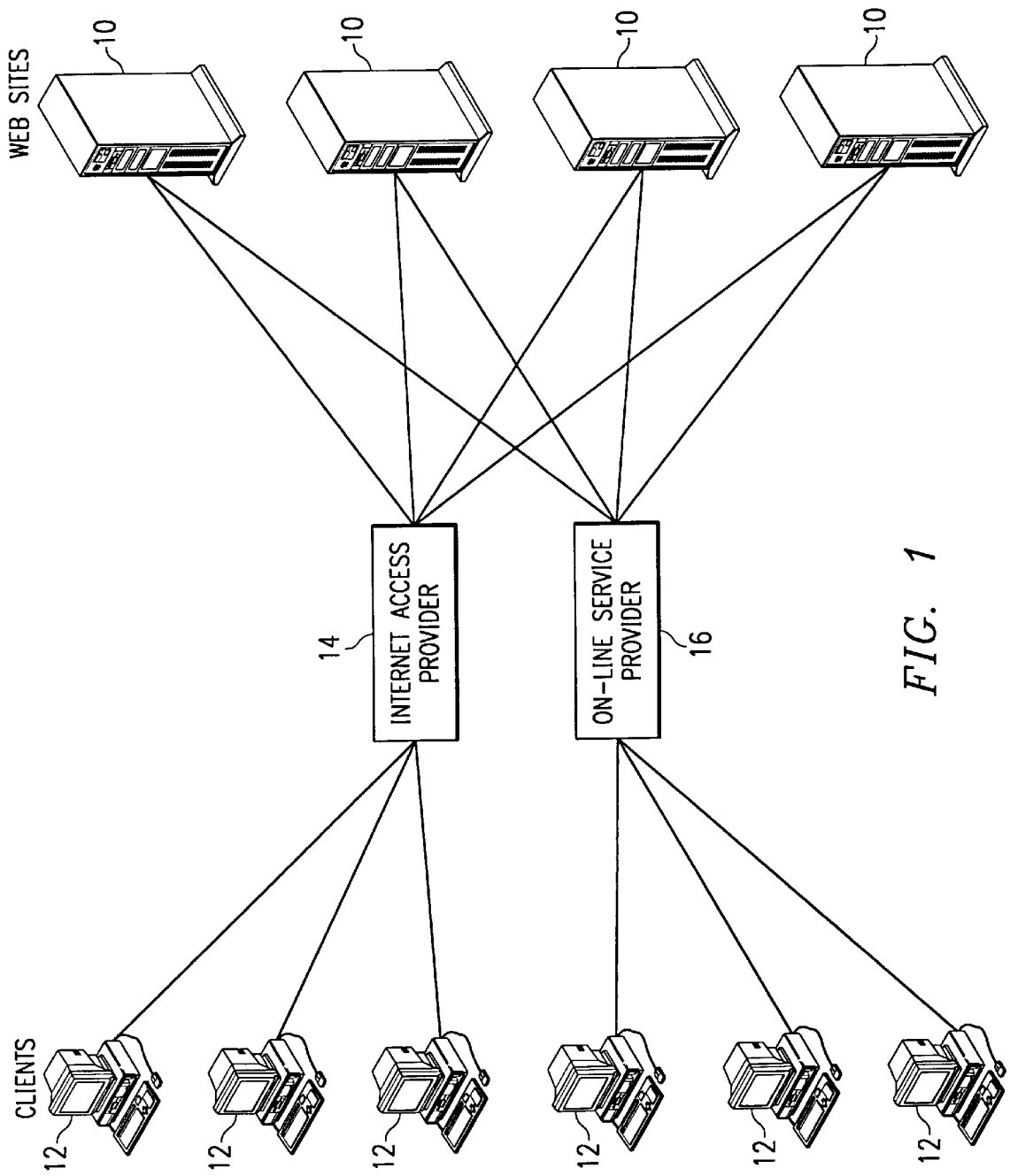
FIG. 1 illustrates a computer network in which the present invention is implemented.

As represented in FIG. 1, the Internet is a known computer network based on the client-server model. Conceptually, the Internet comprises a large network of "servers" 10 which are accessible by "clients" 12, typically users of personal computers, through some private Internet access provider 14 (such as Internet America) or an on-line service provider 16 (such as America On-Line, Prodigy, Compuserve, the Microsoft Network, and the like). Each of the clients may run a "browser," which is a known software tool used to access the servers via the access providers. A server 10 operates a so-called "web site" which supports files in the form of documents and pages. A network path to a server is identified by a so-called Uniform Resource Locator or URL having a known syntax for defining a network connection.

The "World Wide Web" (WWW) is that collection of servers of the Internet that utilize the Hypertext Transfer Protocol (HTTP). HTTP is a known application protocol that provides users access to files (which can be in different formats such as text, graphics, images, sound, video, etc.) using a standard page description language known as Hypertext Markup Language (HTML). HTML provides basic document formatting and allows the developer to specify "links" to other servers and files. Use of an HTML-compliant client browser involves specification of a link via the URL. Upon such specification, the client makes a tcp/ip request to the server identified in the link and receives a "web page" (namely, a document formatted according to HTML) in return.

Figure 2:
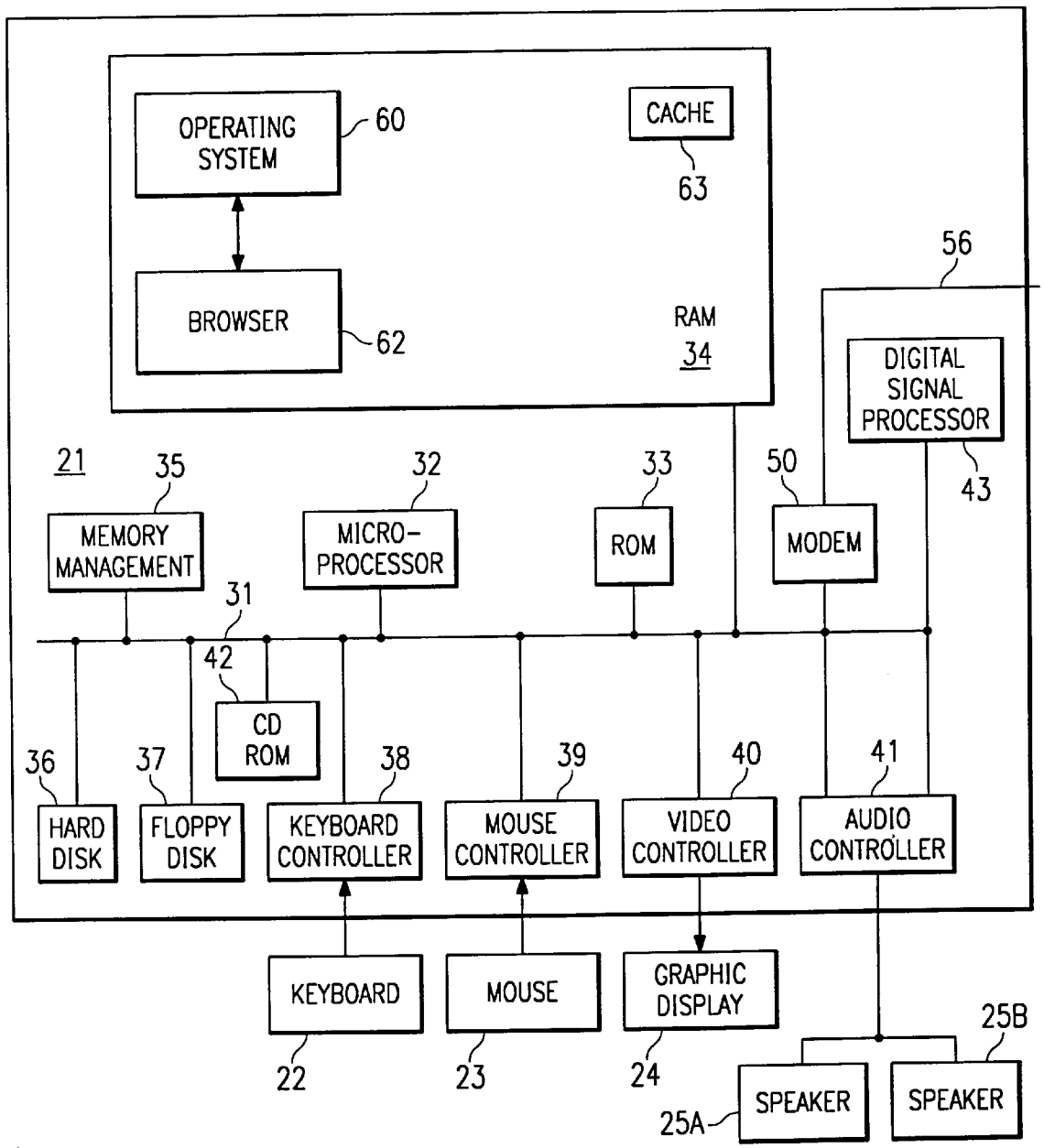
FIG. 2 illustrates a client computer supporting an HTML-compliant World Wide Web browser.

FIGURE 2 shows a block diagram of a representative "client" computer in which the present invention is implemented. The system unit 21 includes a system bus or plurality of system buses 31 to which various components are coupled and by which communication between the various components is accomplished. The microprocessor 32 is connected to the system bus 31 and is supported by read only memory (ROM) 33 and random access memory (RAM) 34 also connected to system bus 31. The ROM 33 contains among other code the Basic Input-Output system (BIOS) which controls basic hardware operations such as the interaction and the disk drives and the keyboard. The RAM 34 is the main memory into which the operating system and application programs are loaded. The memory management chip 35 is connected to the system bus 31 and controls direct memory access operations including, passing data between the RAM 34 and hard disk drive 36 and floppy disk drive 37. The CD ROM 42, also coupled to the system bus 131, is used to store a large amount of data, e.g., a multimedia program or large database.

Also connected to this system bus 31 are various I/O controllers: the keyboard controller 38, the mouse controller 39, the video controller 40, and the audio controller 41. The keyboard controller 38 provides the hardware interface for the keyboard 22, the controller 39 provides the hardware interface for the mouse (or other point and click device) 23, the video controller 40 is the hardware interface for the display 24, and the audio controller 41 is the hardware interface for the multimedia speakers 25a and 25b. A modem 50 enables communication over a network 56 to other computers over the computer network.

The operating system 60 of the computer may be DOS, WINDOWS 3.x, WINDOWS '95, OS/2, AIX, or any other known and available operating system, and each computer is sometimes referred to as a machine. RAM 34 also supports a number of Internet access tools including, for example, the HTTP-compliant web browser 62. Known browser software includes Netscape, Netscape Navigator 2.0, Mosaic, and the like. The present invention is designed to operate within any of these known or developing web browsers, which are preferably modified as described herein to achieve the dynamic display of information objects during web site linking activities. RAM 34 may also support other Internet services including simple mail transfer protocol (SMTP) or e-mail, file transfer protocol (FTP), network news transfer protocol (NNTP) or "Usenet", and remote terminal access (Telnet).

HyperText Markup Language uses so-called "tags," denoted by the <>symbols, with the actual tag between the brackets. Most tags have a beginning (<tag>) and an ending section, with the end shown by the slash symbol (</tag>). There are numerous link tags in HTML to enable the viewer of the document to jump to another place in the same document, to jump to the top of another document, to jump to a specific place in another document, or to create and jump to a remote link (via a new URL) to another server. Links are typically displayed on a web page in color or with an underscore. In response to the user pointing and clicking on the link, the link is said to be "activated" to begin the download of the linked document or text. For more details on HTML, the reader is directed to the *HTML Reference Manual*, published by Sandia National Laboratories, and available on the Internet at "http://www.sandia.gov/sci_compute/html.ref.html" or the *HTML Quick Reference*, published by the University of Kansas, and available_on the Internet at "http://kuhttp.cc.ukans.edu/lynx_help/HTML_quick.html". Each of these publications are incorporated herein by reference.

A known HTML tag is a "comment," which typically allows a web page developer to include text that is to be ignored by the browser. The syntax for a "comment" tag is denoted <!—text—>. HTML is an evolving language. Recent standards for new versions of this language propose to add SGML comment syntax to HTML elements. This proposal would begin a comment with a double dash encountered inside any HTML element (but no inside quotes), and treat every thing as comments (including any """,""", or quote character) until the next occurring double dash. Such syntax allows HTML elements within a comment.

According to the present invention, an information "object" is preferably placed within a comment tag of a web page and thus is "ignored" by the browser in the formatting of the document then being displayed. This information object, however, is also saved to a separate file or cache within the client. A particular web page may have multiple information objects, with one or more objects associated with one or more links in the documents. Thus, for example, if the document has two links, one information object is associated with the first link and a second information object is associated with a second link, and so on. Or, multiple information objects may be associated with a single link. Or, the information object(s) may have no direct relation to the content of any link in the document. While in the preferred embodiment an HTML "comment" tag is used to mask the information object, those skilled in the art will recognize that other HTML commands and tags may be used for this purpose as well, including, for example, a tag dedicated to masking an information object within the currently-displayed page. For example, an information object may be hidden within a clickable image identified with an ismap tag. Also, an information object may be formatted as a "mini" web page by nesting HTML elements within a particular HTML comment tag.

As noted above, a web browser 62 running on the client uses a TCP/IP connection to pass a request to a web server running a HTTP "service" (under the WINDOWS operating system) or "daemon" (under the UNIX operating system). The HTTP service then responds to the request, typically by sending a "web page" formatted in the Hypertext Markup Language, or HTML, to the browser. The browser then displays the web page using local resources (e.g., fonts and colors).

Figure 3:
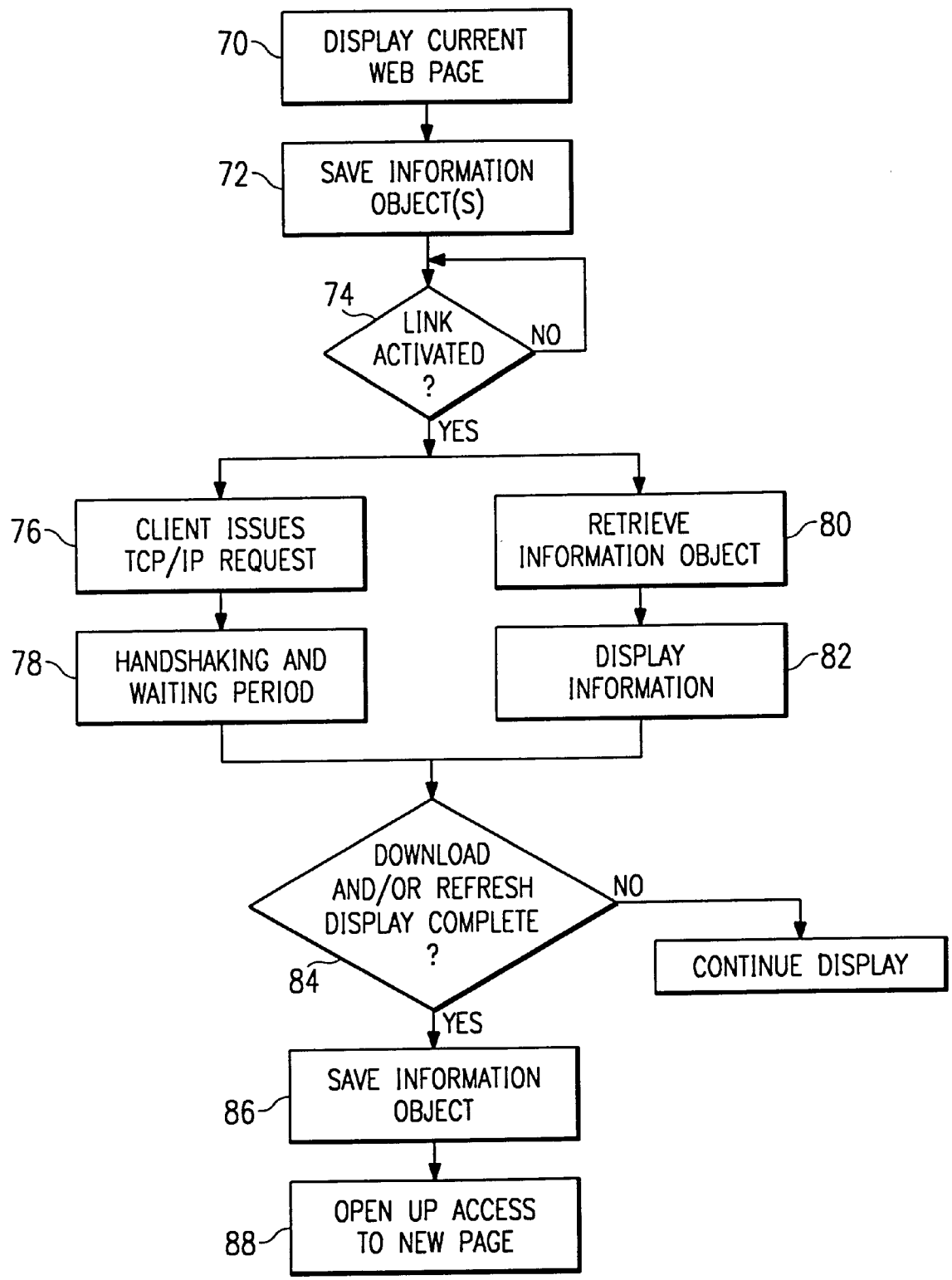
FIG. 3 is a flowchart diagram of a preferred method of the present invention for dynamic display of an information object during linking.

A preferred operation of the inventive method is illustrated in the flowchart of FIG. 3. The method begins at step 70 as a current web page is being displayed on the graphical user interface of the computer. It is assumed that this web page has embedded therein one or more comment tags, each of which (or perhaps several of which in combination) define an information object. Generally, although not required, each information object will be provided for one or more links in the web page being displayed. However, because the information object is embedded within a comment tag, it is hidden or "masked" and thus is ignored by the display routines of the browser. In step 72, the method saves or stores the information object in memory or some dedicated portion of the RAM (e.g., a cache) so that it may be easily and quickly obtained. At step 74, a test is made to determine whether a link associated with the information object has been activated. If so, the method continues at step 76 and issues a tcp/ip request to the network (assuming the link was to a URL). Step 78 represents the handshaking period during which the client waits for the appropriate response from the server. During this period, the client retrieves the information object (at step 80) and outputs the information (in step 82) to the user on the display. Steps 80 and 82 are shown in parallel to the handshaking and wait step 78 to emphasize the inventive concept of displaying useful information to the viewer during the link process. At step 84, a test is then performed to determine whether the download and refresh of the display is complete. If so, the routine saves the information object at step 86 and opens up access to the hypertext document at step 88.

Figure 4:
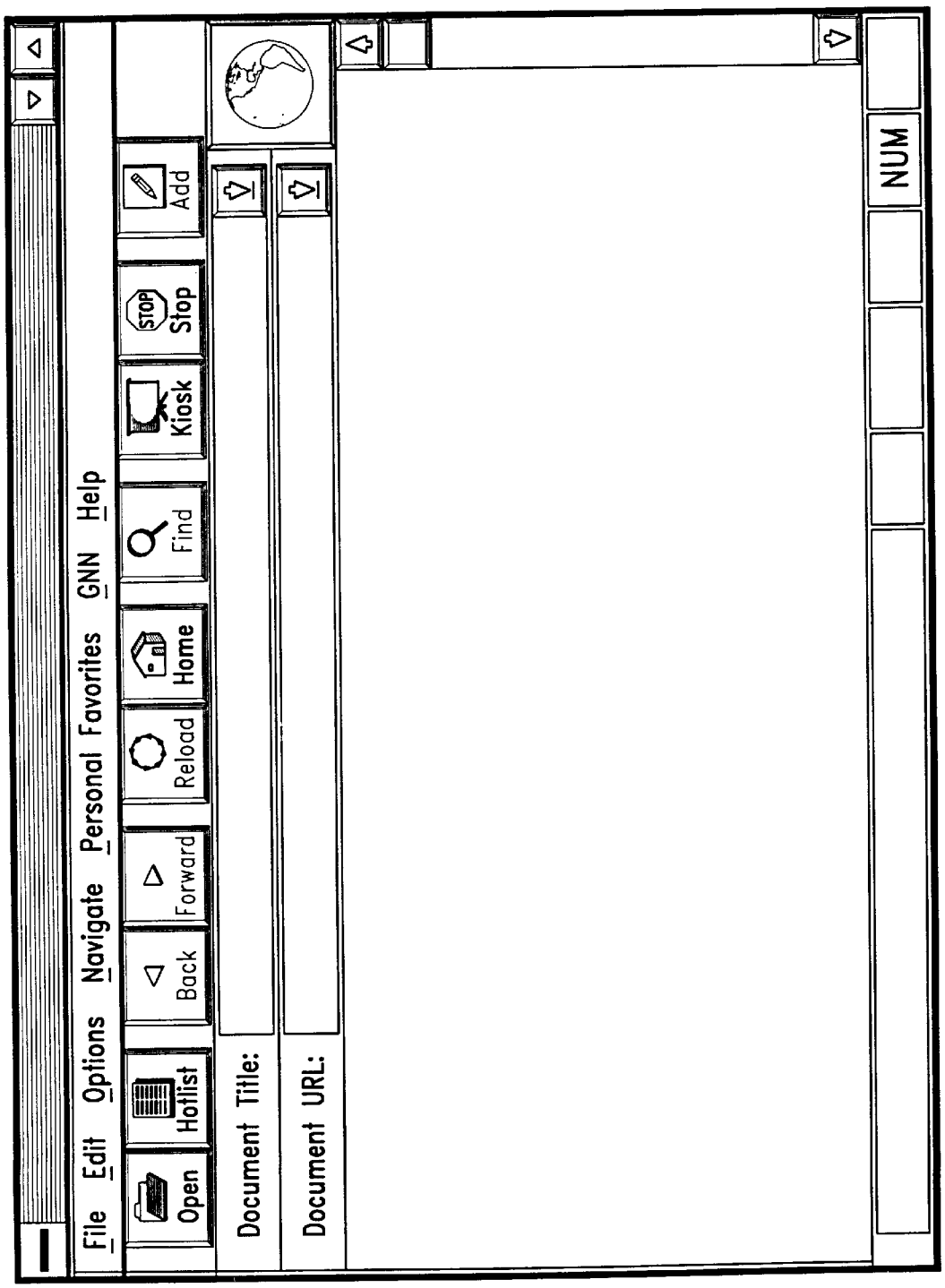
FIG. 4 is a representative graphical user interface illustrating browser navigation tools.
Figure 5:
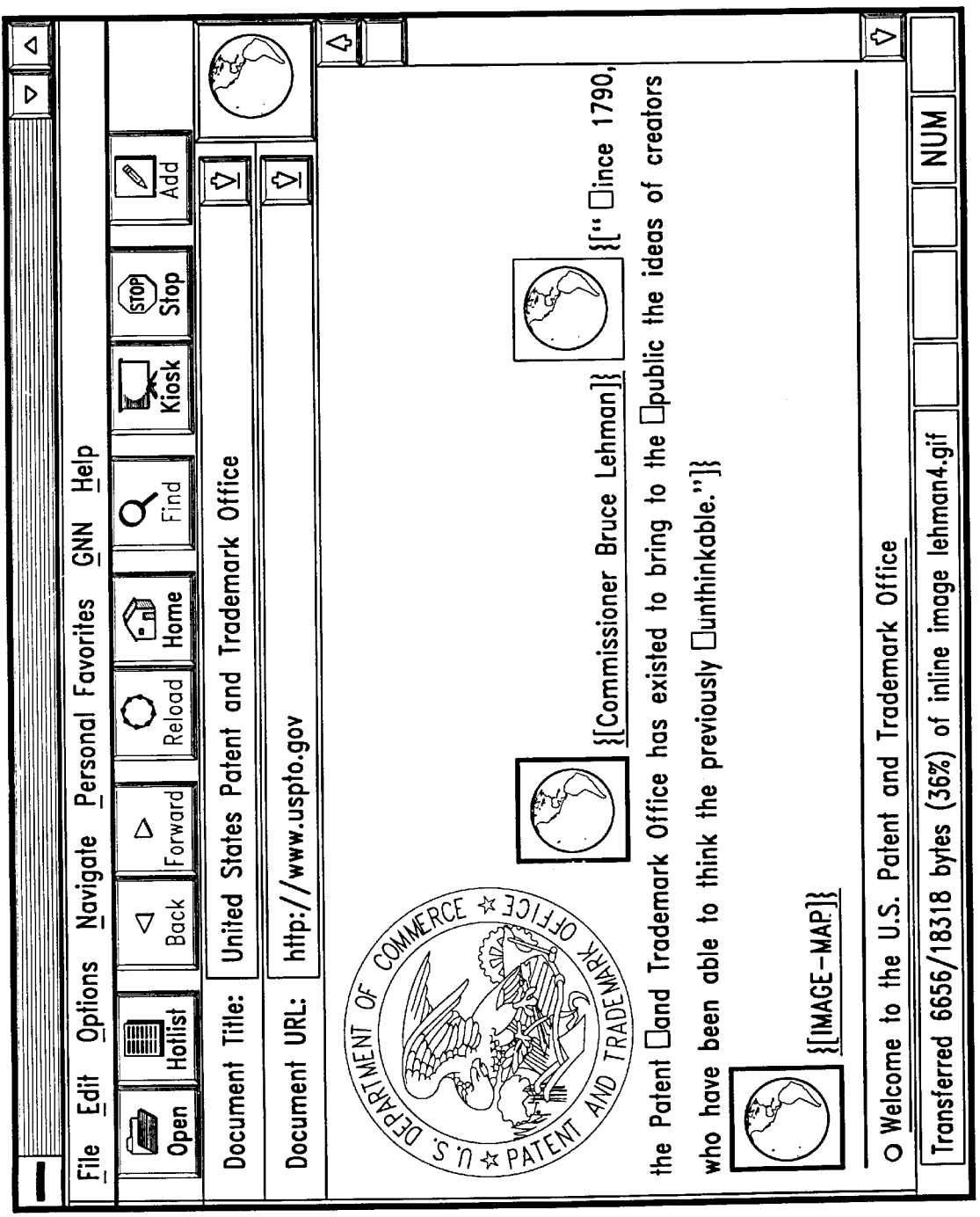
FIG. 5 is a representative web page illustrating a hypertext link.
Figure 8:
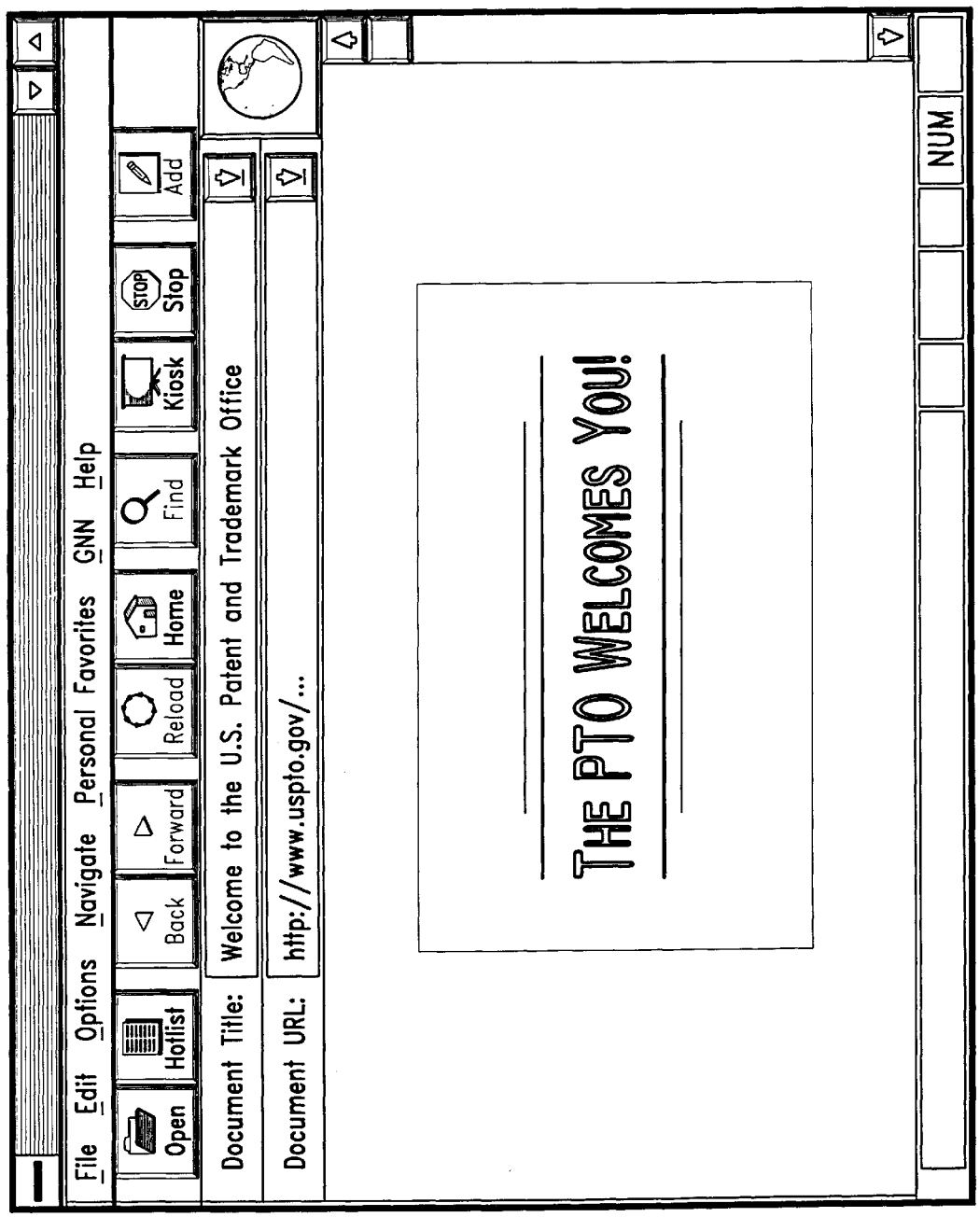
FIG. 8 is a representative screen display illustrating how the information object appears as a "mini" web page upon activation of the hypertext link in the web page of FIG. 5.

FIG. 4 shows the browser navigation tool prior to download of the U.S. Patent and Trademark Office page (available at http://www.uspto.gov). FIG. 5 shows the web page as it exists on the display. This web page has various links including "Welcome to the United States Patent and Trademark Office." FIG. 6 shows the HTML source code used to generate the web page of FIG. 5, and FIG. 7 shows this source code modified to include an information object 75 within a comment tag. This object displays the message "The PTO Welcomes You" when the "Welcome to the United States Patent and Trademark Office" link is activated. FIG. 8 shows the effect of this information object when the routine of FIG. 3 is carried out.

Although the invention has been described in terms of a preferred embodiment, those skilled in the art will recognize that various modifications of the invention can be practiced within the spirit and scope of the appended claims. Thus, for example, the information supplied to the user during the period between link activation and downloading of the hypertext document need not be merely a visual output. It is also envisioned that some or all parts of a particular message be conveyed to the user aurally (via a multimedia speaker set, for example) as well as on the display screen. The message itself may be retained on the screen as an in-line image or other text along with the downloaded hypertext document, and the browser includes appropriate means to queue the message to print and/or to save the message or allow the user to compose a response to the message. One such technique for responding to the message uses the HTML "fill-in" form tags. The browser may be suitably programmed to queue the mini web page for background printing whenever the link is activated.

Moreover, although in the preferred embodiment it is envisioned that the hypertext document (associated with the web page link) is located on a remote server, this is not a limitation of the invention. The display of informational messages may be effected whenever a link is activated, regardless of the location of the target document. Also, while the preferred embodiment has been described in the context of an Internet browser, the techniques of the invention apply whether or not the user accesses the Worldwide Web via a direct Internet connection (namely using an Internet access provider) or indirectly through some on-line service provider (such as America On-Line, Prodigy, Compuserve, the Microsoft Network, or the like). Thus the "computer network" in which the invention is implemented should be broadly construed to include any client-server model from which a client can link to a "remote" document (even if that document is available on the same machine or system).

It should also be appreciated that while in the preferred embodiment the information object is formatted and displayed upon activation of a link in a web page being currently displayed, this is not a limitation of the invention either. The information object need not be embedded within an existing web page, but rather may be embedded within the home page of the browser or supported elsewhere within the client itself. Thus, the information object may be displayed whenever a call to a web page is made, such as when a search to a particular URL is initiated, or when a previously-stored URL is launched (e.g., from a "View Bookmark" pull-down menu). Moreover, the client may store random information objects in the form of information advertisements (which in turn may include .gif files to produce images) so that the browser may call any such information at random. The browser may even be programmed to select which of the plurality of information objects to display based on a comparison of the type of web pages accessed by the user. Thus, for example, if the user accesses web pages relating to a particular service, the browser may be programmed to identify this access history and select predetermined information objects that will be of interest to the user (given that history).

The information objects may themselves be HTML "fill-in" forms that are retained on the display screen and may be filled in with information that the browser can then deliver back to some third party service provider. This enables the information objects to be used as mini survey forms for interactive, on-line surveys and the like, which would be especially advantageous for web site providers or other third parties. The information object may include its own embedded link so that the user can link to another URL directly from the object itself. Thus, for example, where the object is an advertisement, a user could read the ad and then hyperlink to the web page of the company that sponsors the ad.

As noted above, the information object may be automatically or selectively queued to the client printer upon display. This would enable the viewer to generate merchandise coupons and the like related to the web page being accessed. Thus the web site provider could offer the viewer some added incentive for accessing its web page by causing the printing of a redeemable coupon or other information token (e.g., a discount card, a receipt, etc.). All of these actions are initiated during the otherwise downtime between web page access and download, thereby significantly increasing the value of the on-line informational content provided to the user.

As used herein, the "information object" or "information" output to the viewer during the link process should be broadly construed to cover any and all forms of messages, notices, text, graphics, sound, video, tables, diagrams, applets and other content, and combinations of any of the above.

Figure 9:
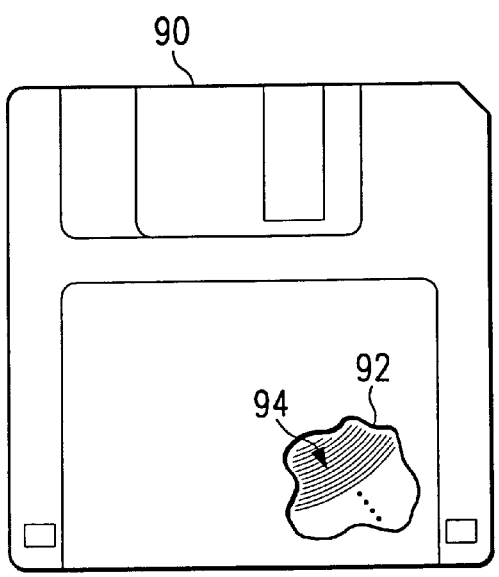
FIG. 9 illustrates a computer program product comprising a substrate in which product data is encoded for carrying out various function of the invention when the product is used to control a processor.

One of the preferred implementations of the "browser" of the invention is as a set of instructions in a code module resident in the random access memory of the user's personal computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). As seen in FIG. 9, for example, the invention may be implemented as a computer program product comprising a computer-readable storage medium 90 having a substrate 92, and program data 94 encoded on the substrate. The program data 94 implements various means for carrying out the above-described functions. The medium 90 may be a separate physical media such as a CD-ROM or floppy diskette, or it may comprise the client computer's hard drive, cache or other available memory, as would be the case if the program data or portions thereof are downloaded via the Internet.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The present invention is designed to be implemented with conventional HTML and enhancements thereto (including HTML 2.0, HTML 3.0, HTML with third party-supplied extensions such as NHTML, and the like), by an HTML-compliant browser, such as Netscape, Netscape Navigator 2.0, Mosaic, MSN, as such existing or developed programs are modified to include the functionality of the invention described above. The functionality may be built into the browser or added as a plug-in. Netscape Navigator 2.0 has in-line support for platform-independent application objects (e.g., applets written in Java, from Sun Microsystems). An applet resides on the server associated with a web page and is downloaded to the client browser after a link is established to the web page. The browser includes an engine for executing the downloaded applets. With this type of browser, the invention caches or otherwise stores a downloaded applet and later uses it, preferably when a new, related link is established. Thus, an "information object" according to the invention may include an applet which, for example, may generate an animated figure or icon, some aural output, a scrolling display, or a combination thereof. One of ordinary skill, however, will recognize that the inventive features of the invention, including the masking of "mini" hypertext documents within a web page and display of such documents upon link activation, may be applied to other Internet services as well as to HTTP compliant browsers. Thus, the invention would be useful to provide information to a user during an FTP access, an on-line chat, a posting to a bulletin board, or even during the sending and retrieval of e-mail. All such variations are considered within the scope of the invention.

Figure 11:
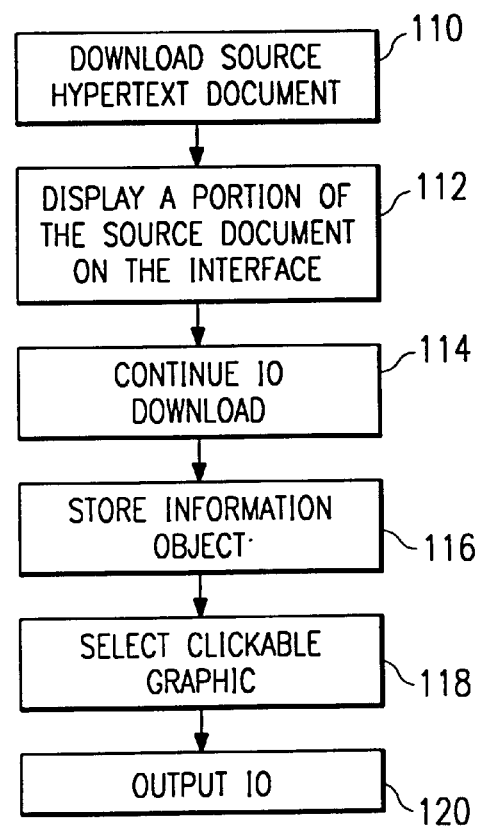
FIG. 11 illustrates a preferred method of downloading an information object to a client computer to facilitate pre-caching of the object.
Figure 10:
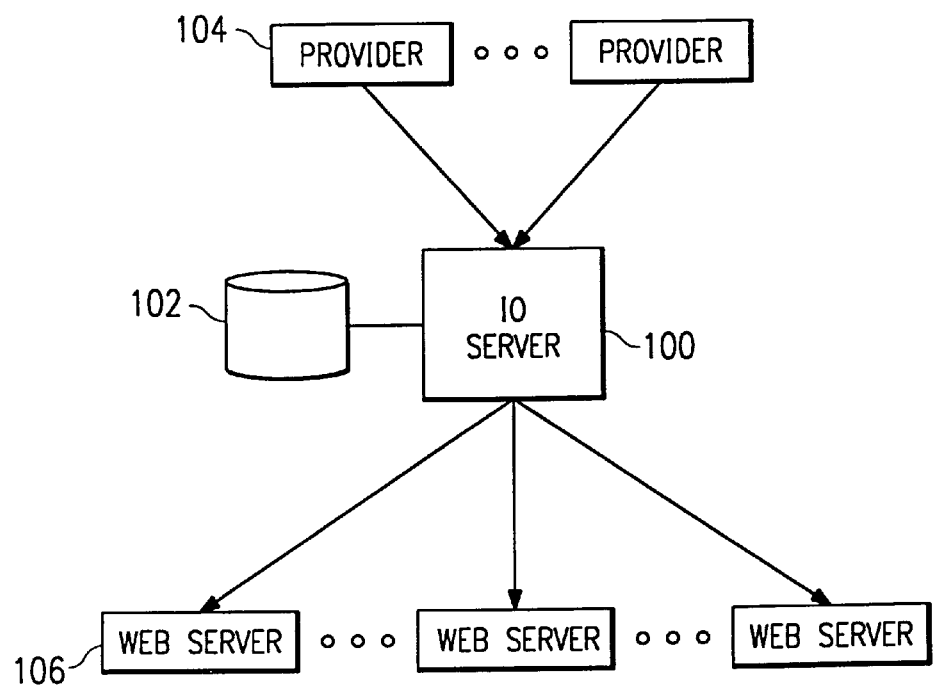
FIG. 10 illustrates a portion of the computer network in which this invention is implemented having a master server for use in distributing information objects to a plurality of servers that support hypertext documents.

FIG. 10 illustrates how information objects (e.g., product/service advertisements) may be distributed to one or more servers in the computer network, and FIG. 11 illustrates a preferred technique for downloading a hypertext document (with its associated information object) to the client machine. Turning initially to FIG. 10, a server 100 provides various control functions and includes an associated information warehouse 102, which is preferably configured as a physically secure electronic repository for the storage of product/service descriptions and associated data. Server 100 may be controlled by an entity that contracts with one or more product/service providers 104 who desire to advertise their products or services through the information objects Entities 104 provide the advertisements, or descriptions and data used to create the advertisements, to the information warehouse preferably in an electronic manner. The information warehouse then electronically delivers the advertisements to one or more of the web servers 106 at which hypertext documents are supported. Advertisements can thus be "refreshed" or updated at any time or at regular intervals irrespective of whether the hypertext documents supported on web servers 106 change. Information objects may then be stored in the web server 106 in a dedicated area or directly embedded or associated with particular hypertext documents stored there.

An information object may include high bandwidth content including high resolution graphics, audio and video. In some instances then, the object may be relatively large in size such that "in-lining" the object an embedded link (e.g., within an HTML comment tag) may not be the most efficient way of downloading. In such case, it will be desirable (although not required) to store the information object in the web server 106 separate from any particular hypertext document so that the object may be downloaded to the client machine (with a hypertext document) by being "appended" at the distal or "backend" of the hypertext document that may be used to bring the object down to the client machine. (Of course, as noted above, information objects may be stored at the client machine in other ways besides being brought down by hypertext documents). This technique is illustrated in FIG. 11.

The method begins at step 110 by downloading a first (or "source") hypertext document (which then becomes the "current web page" within the context of FIG. 3). This document includes an associated information object, such as an advertising graphic that will be associated with some user-selectable display graphic (e.g., a link) in the first hypertext document. At step 112, the browser at the client machine displays at least a portion of the first hypertext document (e.g., introductory text) while the download of the document (and the information object) continues at step 114 as a background process. By "background process," it is meant that the process goes on without being directly or indirectly apparent to the user. This ensures that the user can begin browsing the first hypertext document irrespective of whether the download of the information object is complete. At step 116, the routine continues by storing the information object in a storage of the client machine (e.g., a dedicated cache) as the user browses the first hypertext document. This technique ensures that delivery of relatively large information objects does not otherwise slow down the browsing session. To complete the routine, the user activates the user-selectable clickable graphic at step 118 to link to a second (or "target") hypertext object. As discussed above, this retrieves the information object for display on the client interface as the new link is established. This is step 120.

Under some circumstances, it may be desirable to download the first hypertext document completely and then download the information object separately (e.g., after a time delay), again preferably as a background process. In this manner, the user would not be directly aware that the information object was downloaded as he or she would be browsing the first hypertext document in the foreground. As far as the user is concerned, the first hypertext document is wholly "present" in the client (and is displayed), even though some of the information object is still being downloaded. Thus, as used herein, the concept of "appending" the information object to a hypertext document should be broadly construed to cover both the direct attachment of the object to the document (either directly or otherwise) as well as the serial transmission of the document and then the object (even if there is some finite time delay between such transmissions).

Delaying the download of the information object in this fashion can be advantageous, especially in the situation where the user receives the first hypertext document but then quickly decides to proceed to a URL that is not associated with a link in the document or to link to another URL (in the displayed document) that does not have an associated information object. In either case, the object would not be downloaded at all because the link with which it is associated would not be activated. Thus, it may be desirable to build in a fixed time delay between downloading of the first hypertext document and the information object(s) associated therewith so that if one or more predetermined events occur at the browser (with respect the document), no object download takes place.

Alternatively, information objects may be conveniently downloaded to the browser whenever there is "idle" time during the connection between the client and a server. Thus, an information object need not be appended to a hypertext document at all, but merely downloaded to the client during a period when the user is browsing the current page. Information objects downloaded in this manner are preferably stored in cache in a background process and may or may not be associated with a particular link in the current page. Upon link activation or some other event, however, an object is displayed to the user to provide seamless browsing.

Having thus described my invention, what I claim as new and desire to secure by Letters Patent is set forth in the following claims.

What is claimed is:

1. A method of browsing the Internet using a client browser, comprising the steps of:

downloading a first web page to the client browser over a live connection that has been established between a server and the client browser, the first web page having a link to a second web page;

following download of the first web page, and without user input, downloading an applet to the client browser;

storing the applet in a client cache; and in response to user-initiated selection of the link, using the applet to display an advertisement to the user as the client browser transitions between the first web page and the second web page;

wherein the advertisement is displayed independently of the first and second web pages.

2. The method of browsing the Internet as described in claim 1 wherein the applet is downloaded from the server.

3. A method of browsing the Internet using a client browser, comprising the steps of:

downloading a first web page to the client browser over a live connection that has been established between a server and the client browser, the first web page having a link to a second web page;

following download of the first web page, and without user input, downloading an information object to the client browser;

storing the information object in a client cache;

in response to user-initiated selection of the link, retrieving the information object from the client cache; and displaying the information object to the user independently of the first and second web pages as the client browser transitions between the first web page and the second web page.

4. An interstitial advertising system, comprising:

a first server for serving a first web page to a client machine over a computer network, the first web page having a link to a second web page;

one or more advertisements for goods or services; and an advertising server for serving the advertisements over the computer network, wherein a given advertisement is adapted for interstitial display, independent of the first web page and the second web page, upon the occurrence at the client machine of a user-initiated event for transitioning between the first web page and the second web page.

5. A method for serving a first page of information for delivery over a computer network to a user's browser running on a client, comprising:

receiving a request for the first page made from the user's browser; and serving the first page in response to the request;

wherein the first page includes a link to a second page on the computer network and code for generating a markup language page having content that is displayed interstitially in a pop-up window independent of the first page or the second page when a user selects the link and the browser fetches the second page.

6. The method as described in claim 5 wherein the markup language page is a fill-in form for use in an on-line survey.

7. The method as described in claim 5 wherein the fill-in form is displayed on a terminal of the client to enable the user to supply requested information.

8. An interstitial advertising system, comprising:

a first server for serving a web page to a client having a browser;

a second server for hosting a set of one or more advertisements for goods or services, at least one of the advertisements being delivered to and cached in the client without user input after the web page is served from the first server; and code executable on the client when a user selects a link in the web page for retrieving and displaying the advertisement as the browser transitions between the web page and a new web page, wherein the advertisement is displayed independently of the web page and the new web page.

9. An interstitial display method operative in a browser, comprising:

storing an information object in a cache;

while the browser is displaying a first web page, determining whether a user-initiated event for transitioning between the first web page and a second web page has occurred;

if a user-initiated event for transitioning between the first web page and the second web page has occurred, retrieving the information object from cache while issuing a request to fetch the second web page;

rendering the information object, independently of the first web page and the second web page, while the browser fetches the second web page; and subsequently rendering the second web page.

10. The method as described in claim 9 wherein the information object is an advertisement that is received by the browser as a background process as the browser is displaying the first web page.

* * * * *